M. KOHL AND W. RENNER.
DEMOUNTABLE AUTOMOBILE RIM.
APPLICATION FILED JULY 22, 1920.
1,374,585.
Patented Apr. 12, 1921.
2 SHEETS—SHEET 1.
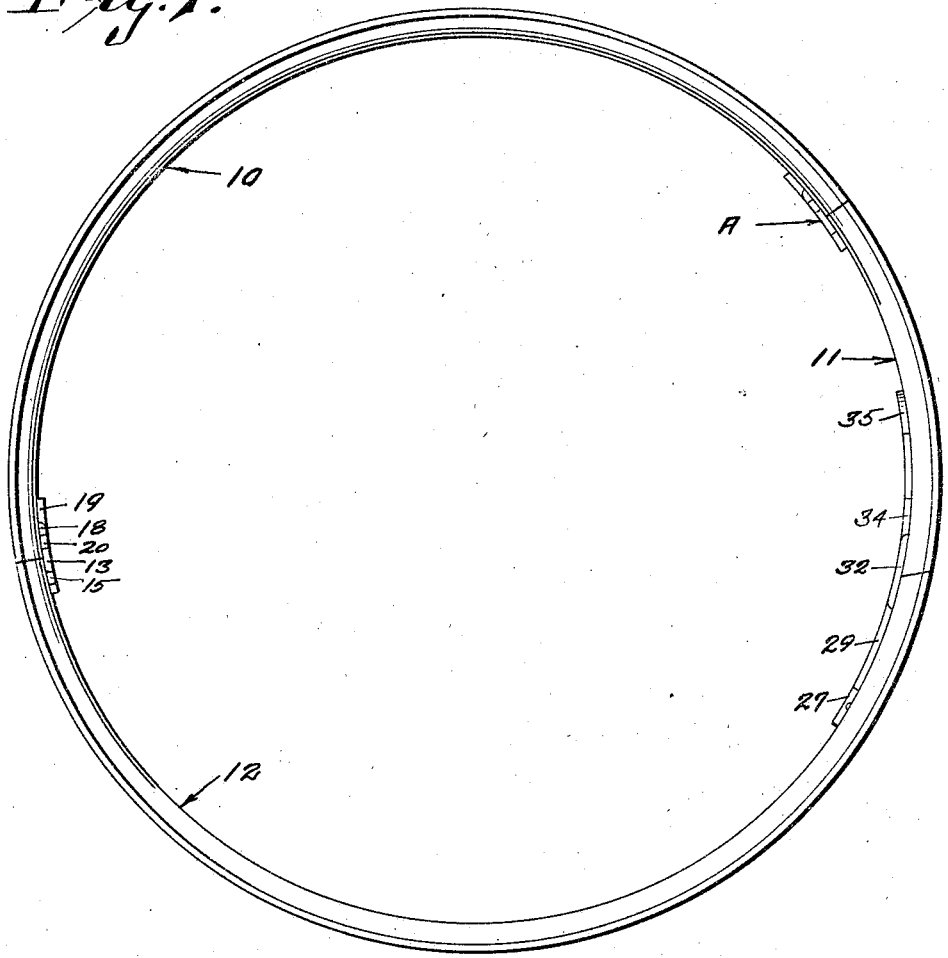
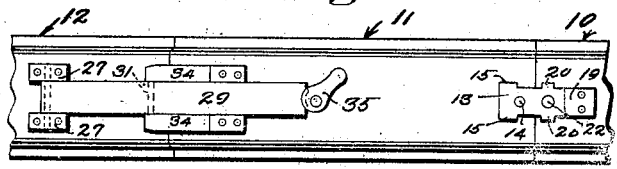
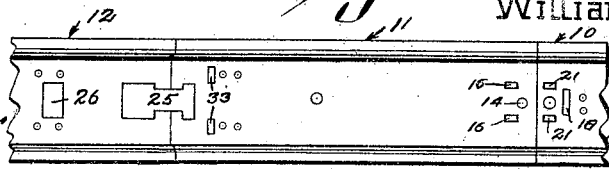
Inventors
Mike Kohl
William Renner

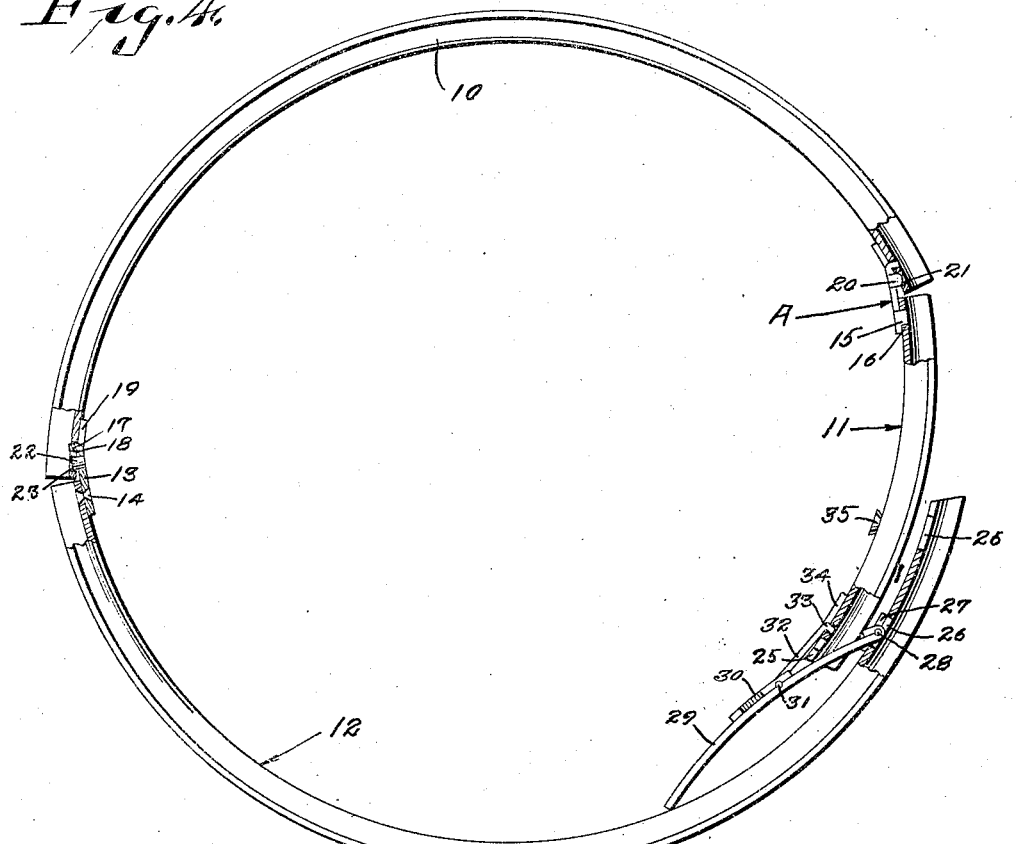
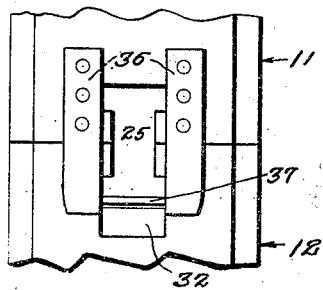
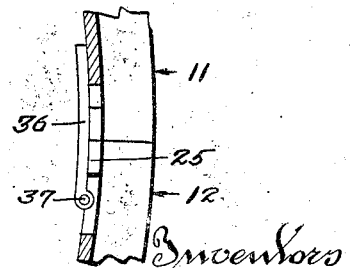

UNITED STATES PATENT OFFICE.

MIKE KOHL, OF NORTH MILWAUKEE, AND WILLIAM RENNER, OF MILWAUKEE, WISCONSIN; SAID RENNER ASSIGNOR TO SAID KOHL.

DEMOUNTABLE AUTOMOBILE-RIM.

1,374,585.   Specification of Letters Patent.   Patented Apr. 12, 1921.

Application filed July 22, 1920. Serial No. 398,163.

*To all whom it may concern:*

Be it known that we, MIKE KOHL and WILLIAM RENNER, citizens of the United States, and residents of North Milwaukee and Milwaukee, in the county of Milwaukee and State of Wisconsin, have invented certain new and useful Improvements in Demountable Automobile - Rims, and we do hereby declare that the following is a full, clear, and exact description thereof.

Our invention relates to improvements in demountable wheel rims for use in connection with pneumatic tires, and it is our purpose, broadly viewed, to provide a rim, the construction of which is such that it may be quickly and easily applied to or removed from a tire without necessitating the employment of special tools.

More particularly it is our purpose to provide a rim which is collapsible to permit its ready detachment from a pneumatic tire, and which may be expanded so as to be engaged with a tire and positively maintained in this position by a device permanently carried by the rim and constituting its operating means.

The rim of our invention consists of a plurality of sections having interlocking engagement with each other and means between certain of the sections operable to positively lock all of the sections against accidental disengagement, which means also acts when moved to unlocked position to positively collapse the sections, and it is in the novel features of construction, combination and relative arrangement of these parts which constitute our invention.

We are disclosing our invention in the best form known to us at present, but it will be understood that it is susceptible to various changes and desirable additions without departing from its spirit or sacrificing any of its advantages, the extent to which we confine ourselves in this respect being defined in and by the appended claims.

In the drawings illustrative of a preferred manner of carrying our invention into practice, Figure 1 is a side elevation of a rim constructed in accordance with our invention, and showing the same locked in its expanded position.

Fig. 2, an inner face view of a portion of the rim, showing the means for contracting and expanding the rim in locked position, Fig. 3, a vew similar to Fig. 2, but looking toward the outer face of the rim, Fig. 4, a side elevation of the rim in collapsed position, Fig. 5, an inner face view of the meeting ends of two of the rim sections, showing a slightly modified construction, and Fig. 6, a section on the line 6—6 of Fig. 5, Referring now to the drawings in detail, it will be observed that our rim in its preferred embodiment is constituted in three secitons, 10, 11 and 12, one of which, section 11, is of considerably less length than the other two sections, which latter are of substantially equal length. Manifestly our rim may be made up of any desired number of sections, but we prefer to construct it of but three sections, because these will accomplish all of the functions of more numerous sections, and the cost of their manufacture and assembly is proportionately less.

The meeting end of sections 10 and 12 are relatively flexibly connected by a plate 13 permanently secured to the end of one of said sections, and so connected with the end of the other of said sections as to constantly maintain the two sections connected, and yet permit them to be angularly moved with respect to each other, much in the manner that an ordinary hinge would permit such angular movement.

Plate 13 is secured to the inner face of one of the rim sections by a rivet or other suitable fastener 14, and said plate has extending therefrom lugs 15 which engage in openings 16 provided in the rim section to receive them, said lugs coacting with said rivet to firmly hold the plate against any movement with respect to its attached rim section whatsoever.

A portion of the plate 13 projects beyond the end of the rim section to which it is secured and terminates in a lug 17 which is bent outwardly at substantially right angles thereto and engaged in an opening 18 in and near the end of the adjacent rim section provided to receive it, a plate 19 being secured to the inner face of the latter rim section and bearing against a portion of said lug 18 to prevent its accidental removal from its opening. Lugs 20, similar to the lugs 15, project outwardly from the sides of the projecting portion of the plate and are received in openings 21 in the adjacent rim section, and these latter lugs serve to relieve the lug 17 of considerable stresses and strains both during use and manipulation of the rim. A pin 22, carried by the projecting portion of the plate and received in an opening 23, in the adjacent rim section, coacts with the lug 17 to further reduce the liability of accidental detachment of the plate and at the same time acts in conjunction with the lugs 20 to take up stresses and strains.

From the foregoing, it will be apparent that a connection is provided between sections 10 and 12 which permits these sections to be moved relatively angularly in the general plane of the rim and which also maintains said sections firmly connected. A similar connection, designated in its entirety by the numeral 24, is provided between the adjacent ends of sections 10 and 11.

A combined operating and locking device for the rim sections is arranged between sections 11 and 12, the adjacent ends of which are preferably cut at an angle, as shown, or cut square if desired. In either event, the end of each rim section has cut therein a T-shaped slot 25, the straight portion of which opens through the end, while the head is disposed inwardly with respect to the body of the rim section.

Somewhat remote from its end having the T-slot, one of the rim sections 11 or 12, preferably the latter, has formed therein an opening 26 and to either side of this opening, upon the inner face of the rim, are secured plates 27. Extending across the opening and having its ends fastened by the plates 27, is a pin 28 upon which is pivotally mounted one end of a lever arm 29 curved to conform to the curvature of the rim when its sections are in expanded position.

Upon its convex face, intermediate its ends, lever arm 29 has secured thereto a plate 30 shaped to be snugly received by both of the T-slots 25 when the sections 11 and 12 are arranged with their adjacent ends in abutting relation.

A pin 31 is secured between the plate 30 and the lever arm 29 with its ends projecting laterally with respect to said plate, and upon these projecting ends of this pin are pivotally connected a pair of arms 32 which are relatively short and terminate in substantially right angularly extending lugs 33 which are received in openings in the body of the adjacent rim section whereby pivotal movement of the lever arm will result in relative longitudinal movement of the two rim sections as will be apparent.

Plates 34, secured to the adjacent rim section abut the ends of the arms and serve to maintain the lugs 33 in their openings.

From the foregoing, it will be apparent that when the lever 29 is swung in one direction the rim as a whole will be contracted and when swung in the reverse direction the rim as a whole will be expanded, the flexible joints between the sections permitting them to swing relatively angularly during contraction and expansion of the rim as previously described. When the lever is swung to expand the rim it will be observed that the plate 30 will move into the T-slots 25 and act to firmly connect the sections 11 and 12, the lever, because of its curvature, lying snugly against the inner faces of the body portions of said sections in which position it may be secured by an eccentrically pivoted dog 35 on the section 11 having a portion which, when moved to one position, will extend over the face end of the lever and prevent the same from being swung upon its pivot. With the rim in expanded position, it is only necessary to release the dog 35 and swing the lever upon its pivot in order to break the beveled joint between sections 11 and 12 and contract the rim.

In Figs. 5 and 6, it will be noted that an arrangement comprising a pair of plates 36 secured to the section 11 and relatively connected by a pin 37 to which may be pivotally connected an arm similar to one of the arms 32, may be provided in lieu of the connection between the lever and section 11 as previously set forth. This arrangement may be used without disturbing the remaining parts of the rim sections or their connecting devices.

We claim:

1. A rim including relatively movable sections, each of said sections having a slot formed therein, a lever pivoted to one of said sections, an arm connecting said lever and the other of said sections, and a plate on said lever and engageable in said slots when the lever is at its limit of pivotal movement in one direction.

2. A rim including a plurality of sections, a plate rigid with one section, a lug on said plate engageable in an opening in the other section, and a pin on said plate coacting with said lug to maintain the sections relatively connected by said plate.

In testimony that we claim the foregoing we have hereunto set our hands at Milwaukee, in the county of Milwaukee and State of Wisconsin.

MIKE KOHL,
WILLIAM RENNER.